United States Patent [19]

Baron

[11] Patent Number: 4,557,285
[45] Date of Patent: Dec. 10, 1985

[54] PLUGGING A CUT PIPE FOR SOLDERING A FITTING

[75] Inventor: Michael Baron, Winnipeg, Canada

[73] Assignee: Baron Enterprises Ltd., Winnipeg, Canada

[21] Appl. No.: 571,807

[22] Filed: Jan. 18, 1984

[51] Int. Cl.$^4$ .............................................. F16K 43/00
[52] U.S. Cl. .......................... 137/15; 29/157.1 R; 29/402.16; 137/315; 137/317; 138/89; 138/97
[58] Field of Search ................ 137/15, 315, 317, 318; 138/89, 94, 97; 29/157 R, 157.1 R, 402.09, 402.16

[56] References Cited

U.S. PATENT DOCUMENTS

| | | | |
|---|---|---|---|
| 2,108,068 | 2/1938 | Larry | 138/94 |
| 2,462,748 | 2/1949 | Johnson | 138/89 |
| 2,725,112 | 11/1955 | Weisman et al. | 138/89 |
| 2,750,601 | 6/1956 | Houle | 138/89 |
| 2,763,282 | 9/1956 | Reedy et al. | 137/318 |
| 2,899,983 | 8/1959 | Farris | 137/318 |
| 3,310,322 | 3/1967 | Carroll | 137/315 |
| 3,669,139 | 6/1972 | Gajdos | 137/317 |
| 3,799,182 | 3/1974 | Long | 137/15 |
| 4,127,141 | 11/1978 | Ledonne et al. | 137/15 |
| 4,327,760 | 5/1982 | Lancaster | 137/315 |

Primary Examiner—George L. Walton
Attorney, Agent, or Firm—Stanley G. Ade; Adrian Battison

[57] ABSTRACT

A pipe plugging tool for use in cutting and then soldering a fitting to a pipe includes a shaft, sleeve, compressible plug and nut arranged so that the nut can be rotated to axially compress the plug so that it radially expands into contact with the inner surface of the pipe. A stop member can be removably and adjustably positioned on the sleeve to set the location of the plug relative to the end of the pipe so that the nut is exposed when the fitting has been completed and so that the plug is spaced from the soldering heat sufficient distance to prevent degradation of the plug. A bag including a zipper and hook loop connecting fabric can be wrapped around the pipe prior to cutting. The bag has sleeves through which the hands of the operator can pass so that the cutting and plugging can be completed inside the bag and any escaping water collected at the bottom of the bag.

12 Claims, 6 Drawing Figures

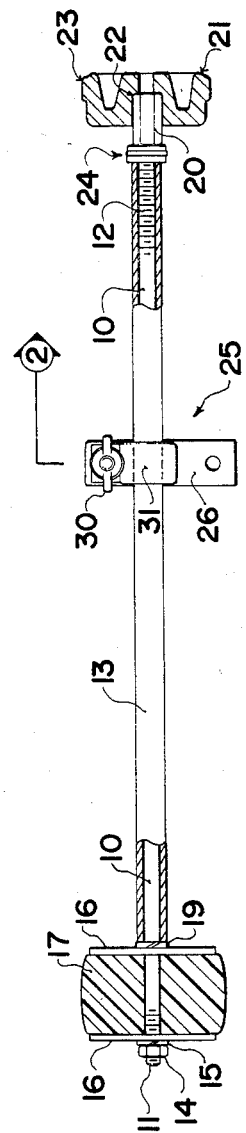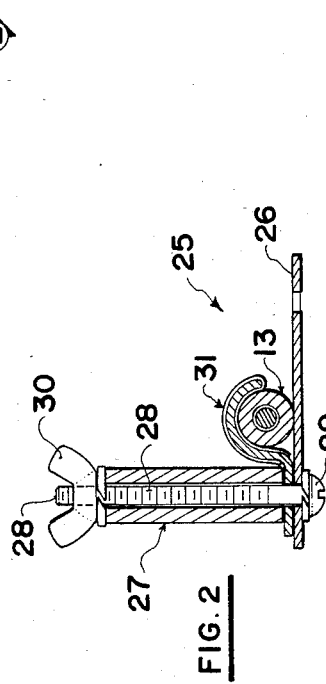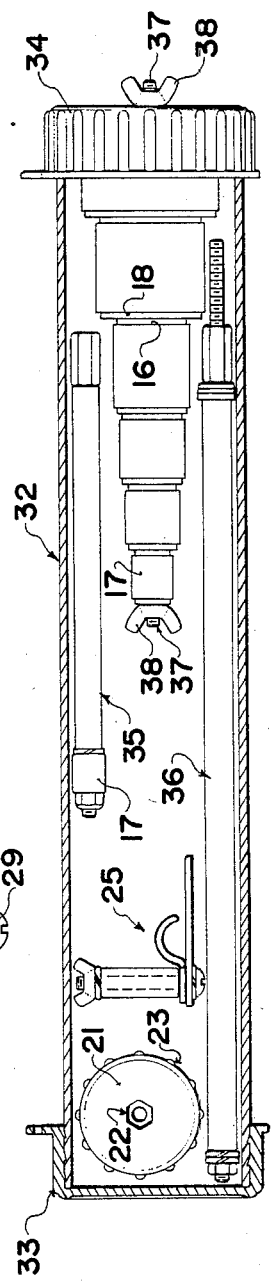

1

PLUGGING A CUT PIPE FOR SOLDERING A FITTING

BACKGROUND OF THE INVENTION

This invention relates to a method and tool for plugging a cut pipe so that a fitting can be soldered to the cut pipe.

Soldering of copper pipe for the attachment of fittings in a water plumbing system is a simple and effective procedure. However, it cannot take place in the presence of water and even small quantities of water remaining in the pipe or running to the fitting during the soldering process can prevent the formation of a properly soldered joint.

It is usually necessary, therefore, to drain completely the plumbing system in which it is intended to add a fitting or to repair a broken pipe. In a normal household situation this is an inefficient but acceptable procedure because the amount of water involved in the pipes of the system is relatively small. Even in this case, however, small amounts of water can continue to run through the pipe even after the major amount of water has been fully drained.

In a major plumbing network, for example in a large building, it is most inconvenient to drain the system firstly because there are large amounts of water involved and secondly because this would interfere with the normal working of the building.

It is one object of the present invention, therefore, to provide a method and plumbing tool for plugging a pipe after the pipe has been cut for the soldering of a fitting to the cut end.

According to a first aspect of the invention, therefore, there is provided a plumbing tool for use in plugging a cut pipe for attachment of a fitting to the cut end of the pipe, the tool comprising a shaft, a sleeve surrounding the shaft, a screw threaded portion at one end of the shaft, a nut for engaging the screw threaded portion, a cylindrical resilient plug member for mounting on the end of the shaft remote from the screw threaded portion and arranged such that rotation of the nut and the screw threaded portion causes relative axial movement of the sleeve and the shaft axially compressing the resilient plug member so that the plug expands radially into contact with the inside surface of the pipe to plug the pipe, the radial extent of the shaft, sleeve, nut and plug being less than that of the pipe, and a stop member removably and axially adjustably mountable on the sleeve for locating the position of the plug member and nut relative to the end of the pipe.

According to a second aspect of the invention, there is provided a plumbing tool for use in plugging a cut pipe for attachment of a fitting to the cut end of the pipe, the tool comprising a shaft, a sleeve surrounding the shaft, a screw threaded portion at one end of the shaft, a nut engaging the screw threaded portion, a cylindrical resilient plug member for mounting on the end of the shaft remote from the screw threaded portion and arranged such that rotation of the nut and the screw threaded portion causes relative axial movement of the sleeve and the shaft axially compressing the resilient plug member so that the plug expands radially into contact with the inside surface of the pipe to plug the pipe, the radial extent of the shaft, sleeve, nut and plug being less than that of the pipe, and the length of the shaft being greater thn the length of a fitting for the pipe plus four inches whereby the plug member can be located within the pipe at least four inches from the fitting while the nut projects from the end of the fitting remote from the pipe.

According to a third aspect of the invention, there is provided a kit of parts for use in plugging cut pipes for attachment of a fitting to the cut end of pipe comprising two shafts, each having a sleeve therearound, a screw threaded portion at one end of the shaft and a nut for engaging the screw threaded portion, and a plurality of cylindrical resilient plug members in a range of diameters from half inch through two and a half inches each for mounting in turn on the end of one of the shafts remote from the screw threaded portion and arranged such that rotation of the nut on the screw threaded portion causes relative axial movement between the sleeve and the shaft axially compressing the resilient plug member so that it radially expands into contact with the inside surface of the pipe to plug the pipe, the diametrical extent of the shafts, sleeves and nuts being less than one half inch, the length of one of the shafts being greater than the length of a fitting for a two and a half inch pipe plus four inches whereby the plug member can be located within the pipe at least four inches from the fitting while the nut projects from the end of the fitting remote from the pipe and the length of the other shaft being shorter than the first shaft and a stop member removably and axially adjustably mountable on the sleeve of the shafts for locating the position of the plug member and nut relative to the end of the pipe.

According to a fourth aspect of the invention there is provided a method of attaching a fitting to a pipe using a tool for plugging the pipe comprising a shaft, a sleeve surrounding the shaft, a screw threaded portion at one end of the shaft, a nut for engaging the screw threaded portion, a cylindrical resilient plug member for mounting on the end of the shaft remote from the screw threaded portion and arranged such that rotation of the nut and the screw threaded portion causes relative axial movement of the sleeve and the shaft axially compressing the resilient plug member so that the plug expands radially into contact with the inside surface of the pipe to plug the pipe, the radial extent of the shaft, sleeve, nut and plug being less than that of the pipe, the method comprising attaching a stop member to the shaft at such a position that with the shaft extending through the fitting, the nut is just exposed, cutting the pipe, inserting the plug member and shaft into the pipe until the stop engages the end of the pipe, rotating the nut to radially expand the plug to plug the pipe, the length of the shaft being such that the plug member is located within the pipe at least four inches from the end of the pipe, soldering the end of the pipe to the fitting and removing the plug member and shaft from the pipe through the fitting.

The invention therefore provides a number of advantages. Firstly, it enables the plug to be accurately located within the pipe after it has been cut and while the water is flowing from the pipe so that after the fitting has been applied to the pipe, the nut is still exposed to allow the plug to be removed and also the plug itself is spaced as far as possible from the point of application of heat for the soldering function.

Secondly, the tool is designed particularly for use in soldering copper pipe in that the length of the shaft and sleeve is sufficient such that it can accommodate the fitting and also space the plug from the end of the pipe where the heat is applied in the soldering technique sufficiently so that the plug is undamaged by the heat. Furthermore, the plug itself is manufactured from a material which is more resistant to heat than conventional rubber.

It will be appreciated that the fittings for particular diameter of pipe have a particular length so that the fittings for, for example, a two and a half inch pipe, are considerably longer than those for, for example, a half inch pipe.

The fitting can include a valve so that after the plug has been removed, the valve can be closed off to prevent further escape of water. In this regard the plug, shaft and sleeve all must be considerably less than the diameter of the pipe in order to pass through the seat of the valve fitting. In view of this small diameter of the plug, it is important that the plug can be radially expanded from a position in which it is out of contact with the inner surface of the pipe.

Thus, there can be provided lock washers for locking the sleeve to the plug and the plug to the shaft to prevent rotation of the shaft relative to the sleeve so that rotation of the nut drives the sleeve axially while the sleeve is held against rotation.

In addition, in areas where the escape of any water could be damaging to finished decorations, the tool can also include a bag which can be mounted on the pipe and held away from the pipe by supports so that the operative can place his hands through openings in the bag to work upon the pipe inside the bag. A connection at the bottom of the bag can run the water which escapes from the pipe after cutting and before the plug is inserted to a drain or to another collecting device.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a cross sectional view through a plumbing tool including a plug for plugging a cut pipe.

FIG. 2 is a cross sectional view along the lines 2—2 of FIG. 1.

FIG. 3 is a cross sectional view through a container providing a kit of parts to enable the tool of FIG. 1 to accommodate various diameters of pipe.

In the drawings like characters of reference indicate corresponding parts in the different figures.

DETAILED DESCRIPTION

Figure 4:
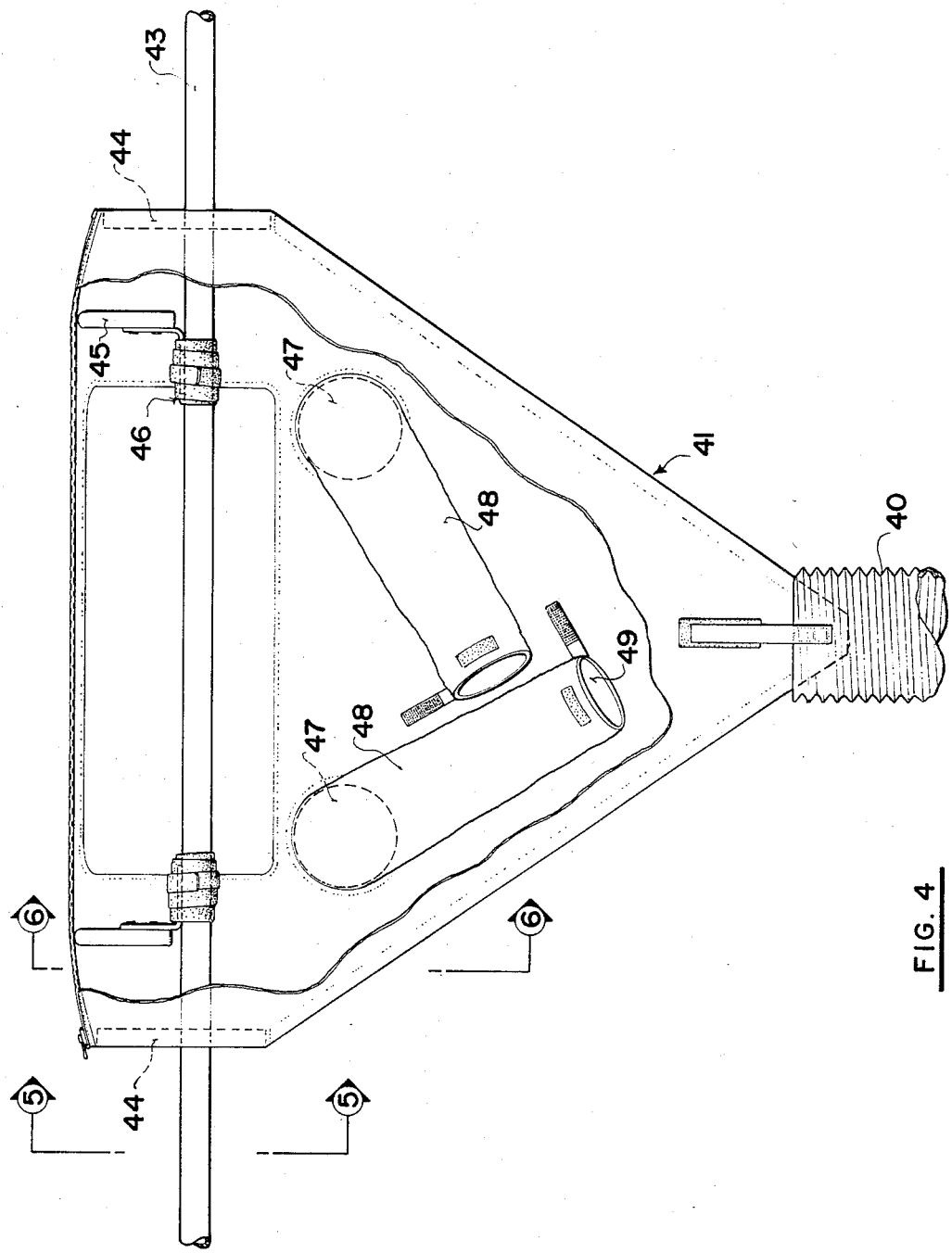
FIG. 4 is a side elevational view of a bag for surrounding the cut pipe so that the cutting and plugging operation can be carried out without allowing the escape of water.

The basic tool itself is illustrated in FIG. 1 and comprises a shaft 10 of small diameter that is considerably less than half inch which is solid so that water cannot be transmitted through the body of the shaft and has a threaded section at each end indicated at 11 and 12 respectively. A sleeve 13 which extends most of the way along the shaft 10 is co-axially mounted around the shaft and the sleeve again has a diameter less than half inch.

At the end 11 of the shaft a nut 14 is engaged on the screw thread 11 and holds in place a lock washer 15, a plain washer 16, a resilient rubber plug 17, a second plain washer 16 and a further lock washer 19.

The diameter of the plug 17 is arranged to be slightly less than the inside diameter of the pipe for which it is intended. The plain washers 16 are of the same diameter. The plug 17 is solid apart from a central bore for receving the shaft 10.

The lock washers 15 and 19 include axial projections or roughening portions which inhibit rotation between the parts on either side of the washer. Thus, the lock washer 19 tends to lock the sleeve 13 to the washer 16 and similarly the washer 15 tends to lock the washer 16 to the nut 14. In this way, the sleeve 13 is prevented or at least inhibited from rotating relative to the shaft 10.

At the other end of the shaft 10 on the screw threaded section 12 is received a further nut 20 of sufficient length to enable it to be readily grasped by a wrench or more preferably by a hand wheel 21 which has a tapered bore 22 shaped to receive the nut so it can be readily placed over the nut to grasp the nut. The hand wheel has nails or projections 23 for engaging the hand of the user so the nut can be readily rotated by the hand wheel 21 to engage with the screw thread 12.

Between the nut 20 and the sleeve 13 is provided a slip washer 24 provided by a pair of washers spacing a central bearing washer so that the tendency of the nut 20 to turn relative to the sleeve 13 is much greater than the tendency of the sleeve 13 to rotate relative to the plug 17 and therefore relative to the shaft 10.

Thus, if the sleeve is held stationary and the hand wheel 21 rotated, the nut moves axially of the shaft to relatively axially move the shaft and sleeve so that the plug 17 is compressed axially and therefore expands radially into contact with the inner surface of the pipe.

A stop member generally indicated at 25 as shown in FIG. 2 comprises a plate 26 and a post or sleeve 27 mounted on the plate at right angles thereto. The sleeve 27 receives a shaft 28 which passes through the plate 26 and remains in contact therewith by virtue of a head 29. The shaft 28 is threaded at the other end to receive a wing nut 30 for clamping a curved rubber-coated plate 31 against the plate 26. The plate 31 and the plate 26 cooperate to clamp the sleeve 13 to lock the stop member 25 in position at a desired location on the sleeve 13.

In addition, by releasing the plate 31 from the plate 36 a suitable distance, the plate 26 can be turned and the stop member removed from the shaft 13.

In use of the tool illustrated in FIGS. 1 and 2, firstly the fitting which is to be applied to the pipe after cutting is placed alongside the shaft 10 and the stop member 25 placed in position on the shaft 10 at a position so that it coincides with one end of the fitting when the nut 20 just emerges from the other end of the fitting. The stop 25 is then clamped into position on the shaft or sleeve 13.

The nut 20 is then adjusted by the hand wheel 21 until the plug 17 is in relaxed state so that it has an outside diameter less than that of the inside diameter of the pipe to be cut. The pipe is then cut and as quickly as possible thereafter, the plug is inserted into the cut end of the pipe until the stop 25 engages the cut end.

It will be appreciated that during this movement water is escaping from the pipe and even if the water is not under pressure, the amount of water escaping can be quite considerable and thus obscures the plug and shaft while they are being inserted into the cut end of the pipe. The stop 25 therefore accurately locates the plug within the cut pipe. It will be noted that the dimension of the plate 26 is such that it engages the edge of the pipe even on the largest diameter pipe which can be, for example, two and a half inches.

It will be noted that the length of the shaft is such that a considerable distance is provided between the plug and the stop 25. In one example, the length of the shaft for use with a two and a half inch diameter pipe is fifteen inches and this allows at least four inches between the stop 25 and the plug 17 when the stop is positioned to accommodate the normal fitings used with a two and a half inch pipe.

In this way, the plug 17 is located at least four inches from the end of the pipe so that when soldering of the pipe to the fitting takes place, the heat from the soldering does not damage the rubber of the plug 17. For this purpose, the plug is formed of a high heat resistance rubber which can accept up to 320° F. which is considerably higher than conventional rubber.

Soldering takes place generally at around 415° F. and the spacing between the application of heat and the plug together with the fact that the plug is usually in contact with cold or cooler water allows soldering to take place without causing any damage or degradation of the rubber plug.

It will be appreciated that prior to inserting the fitting onto the end of the pipe the stop 25 and the hand wheel 21 are both removed from the shaft to allow the fitting to slide over the end of the shaft 10. For this reason the nut 20 and the sleeve 13 are all of a diameter less than that of the smallest pipe for which the tool is intended which generally will be one half inch.

After soldering of the fitting is complete, the hand wheel can be returned to the nut 20 which is then exposed from the end of the fitting in view of the previous adjustment of the stop 25 and the nut can be loosened to return the plug 17 to its relaxed condition.

In this condition the plug is free from the inner surface of the pipe and therefore can be removed along the pipe and through the fitting. Generally, the plug should be of the order of 1/16 to 3/16 inches less than the inside diameter of the pipe for which it is intended in order to accommodate the reduced dimension inside some fittings, for example those having valve control.

Turning now to FIG. 3, there is shown a kit of parts for providing the tool of FIGS. 1 and 2 and to allow it to be used with a number of different diameter pipes. Thus, within a cylindrical container 32 having end caps 33, 34 which are screwed onto the outer surface of the cylindrical container are provided a number of parts. The parts comprise a first shaft and plug similar to that illustrated in FIG. 1 and indicated generally at 35 and a second similar shaft illustrated generally at 36. The first is for use exclusively with the half inch diameter pipe and therefore has a plug which is slightly less than half inch diameter as previously explained. Also the length of the shaft is arranged such that it is in total the length of a fitting plus approximately four inches so that, as previously explained, the nut can be exposed from a fitting while the plug is at least four inches from the end of the pipe. Thus, in total the shaft is of the order of seven inches in length.

The other shaft 36 is as previously described of the order of fifteen inches in length so that it can accommodate three quarter inch up to two and a half inch plugs.

The hand wheel 21 and stop 25 are also provided in the container for use with either of the shafts 35, 36. The plugs themselves are mounted on a shaft 37 affixed centrally of one of the end caps 34 and retained on the shaft by wing nuts 38 which cooperate with screw threaded portions of the shaft 37.

Thus, the plugs can be removed from either end of the shaft by undoing one of the wing nuts 38. The collars 16, 18 are also retained on the shaft 37. When it is required to use one of the other plugs 17, these can be removed from the shaft 37 and replaced on the shaft 36 with the plug from that shaft being carried on the shaft 37.

Figure 5:
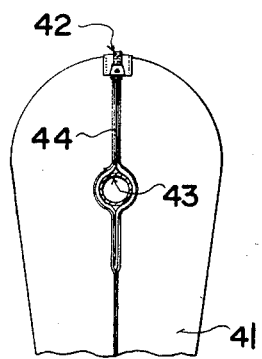
FIG. 5 is a view along the lines 5—5 of FIG. 4.
Figure 6:
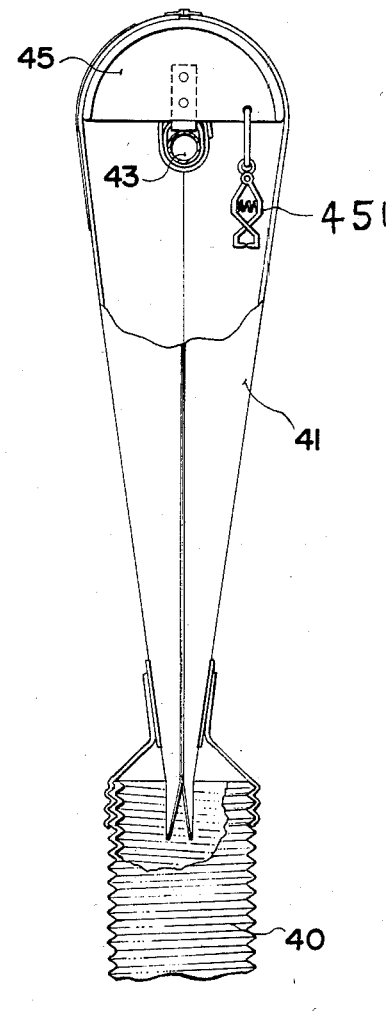
FIG. 6 is a view along the lines 6—6 of FIG. 4.

Turning now to FIGS. 4, 5 and 6, there is provided a cover arrangement for the pipe which can be used in conjunction with the tool as previously described. The cover arrangement is particularly effective in areas which are finished and hence cannot receive any spilled water, but also can be used merely to prevent water spraying from the pipe from contacting the user of the tool.

The cover comprises a plastic bag which is generally conical in shape leading downwardly from a wider upper end to a small opening at the lower end for attachment by any suitable mechanism to a pipe 40 which can lead to a drain or other suitable collection device.

The bag indicated generally at 41 includes a zipper 42 across the upper end of the bag so that it can be opened to envelop the pipe indicated at 43. So that the bag can closely surround the pipe at the ends of the bag and so that it can accommodate different diameters of pipe, the ends of the zipper 42 communicate to the remainder of the bag by a portion of hook and loop connector fabric (that manufactured under the trademark Velcro is suitable) indicated at 44. Thus, the connector fabric as shown in FIG. 5 closes the bag on either side of the pipe 43 and also closely surrounds the pipe 43 so as to effectively form a seal around the pipe.

In order to support the bag away from the pipe on either side of the area to be cut, there is provided a semi-circular plate 45 which extends around the pipe 43 on the upper surface thereof as shown in FIG. 6. The plate 45 is attached to the pipe by a support bar 46 which extends along the plate and there is provided a length of wrapping material terminating in a connector fabric so that the wrapping material can be wrapped around the pipe and the support bar 46 to hold the plate 45 in the upwardly extending position above the pipe 43.

Before the bag is wrapped around the pipe 43, the operator can insert the tools, that is a pipe cutter (not shown) can be attached to the pipe and the plugging tool as illustrated in FIG. 1 can be hung from a clamp 451 on the plate 45. The hands are then inserted through openings 47 which include sleeves 48 extending into the bag terminating in cuffs 49 which can be closed around the wrist of the user to provide a waterproof seal. Thus the user can insert his arms into the sleeves 48 and his hands through the cuffs 49 so that he can use the tools within the bag without water escaping from the bag.

The user can therefore adjust and set up the plugging tool as previously explained and then cut the pipe with the pipe cutter. After the pipe is plugged and all the water which has escaped during the cutting and plugging has run to waste through the duct 40, the bag can be removed and the necessary soldering completed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A plumbing tool for use in plugging a cut pipe for attachment of a fitting to the end of the pipe, the tool comprising a shaft, a sleeve surrounding the shaft, a screw threaded portion at one end of the shaft, a nut for engaging the screw threaded portion, a cylindrical resilient plub member for mounting on the end of the shaft remote from the screw threaded portion and arranged such that rotation of the nut and the screw threaded portion causes relative axial movement at the sleeve and shaft axially compressing the resilient plug members so that the plug member expands radially into contact with an inside surface of the pipe to plug the pipe, the radial extent of the shaft, sleeve, nut and plug member being less than that of the pipe, and a stop member having a radial extent greater than that of the pipe, said stop member including clamp means for engaging around the sleeve and arranged whereby the stop member can be adjusted axially of the sleeve for locating the position of the plug member and nut relative to the end of the pipe and removed therefrom to allow passage of the fitting over the shaft from said one end to said plug member.

2. The tool according to claim 1 wherein the length of the shaft is greater than the length of a fitting for the pipe plus four inches whereby the plug member can be located within the pipe at least four inches from the fitting while the nut porjects from the end of the fitting remote from the pipe.

3. The tool according to claim 1 wherein the plug member is formed from a material having greater heat resistance than that of conventional rubber.

4. A tool according to claim 1 wherein the shaft is solid.

5. A tool according to claim 1 wherein there is provided a hand wheel with a tapered central opening for removably engaging the end of the nut.

6. A tool according to claim 1 including means for preventing rotation of the shaft relative to the sleeve whereby the plug member can be radially expanded from a position in which it is spaced from the walls of the pipe and thus free to rotate relative thereto.

7. The invention according to claim 1 including a flexible water impermeable bag, means for attaching the bag to a pipe such that it surrounds a portion of the pipe, support means for lifting part of the bag away from the pipe to allow access to the pipe, hand receiving opening means in the bag whereby the operator can insert his hands into the interior of the bag for operating upon the pipe and liquid drain means for draining liquid escaping from the pipe to the bag.

8. A kit of parts for use in plugging cut pipes for attachment of a fitting to the cut end of the pipe comprising two shafts, each having a sleeve therearound, a screw threaded portion at one end of the shaft and a nut for engaging the screw threaded portion, and a plurality of cylindrical resilient plug members in a range of diameters from half inch through two and a half inches each for mounting in turn on the end of one of the shafts remote from the screw threaded portion and arranged such that rotation of the nut on the screw threaded portion causes relative axial movement between the sleeve and the shaft axially compressing the resilient plug member so that it radially expands into contact with the inside surface of the pipe to plug the pipe, the diametrical extent of the shafts, sleeves and nuts being less than one half inch, the length of one of the shafts being greater than the length of a fitting for a two and a half inch pipe plus four inches whereby the plug member can be located within the pipe at least four inches from the fitting while the nut projects from the end of the fitting remote from the pipe and the length of the other shaft being shorter than the first shaft and a stop member having a radial extent greater than that of the pipe, said stop member including clamp means for engaging around the sleeve and arranged whereby the stop member can be adjusted axially of the sleeves for locating the position of the plug member and nut relative to the end of the pipe and removed therefrom to allow passage of the fitting over the shaft from said one end to said plug member.

9. The invention according to claim 8 including a flexible water impermeable bag, means for attaching the bag to pipe such that it surrounds a portion of the pipe, support means for lifting part of the bag away from the pipe to allow access to the pipe, hand receiving opening means in the bag whereby the operator can insert his hands into the interior of the bag for operating upon the pipe and liquid drain means for draining liquid escaping from the pipe to the bag.

10. A method of attaching a fitting to a pipe using a tool for plugging the pipe comprising a shaft, a sleeve surrounding the shaft, a screw threaded portion at one end of the shaft, a nut for engaging the screw threaded portion, cylindrical resilient plug member for mounting on the end of the shaft remote from the screw threaded portion and arranged such that rotation of the nut and the screw threaded portion causes relative axial movement of the sleeve and the shaft axially compressing the resilient plug member so that the plug expands radially into contact with the inside surface of the pipe to plug the pipe, the radial extend of the shaft, sleeve, nut and plug being less than that of the pipe, the method comprising attaching a stop member to the shaft at such a position that with the shaft extending through the fitting, the nut is just exposed, cutting the pipe, inserting the plug member and shaft into the pipe until the stop engages the end of the pipe, rotating the nut to radially expand the plug to plug the pipe, the length of the shaft being such that the plug member is located within the pipe at least four inches from the end of the pipe, removing the stop member, applying the fitting over the shaft to engage said cut end, soldering the end of the pipe to the fitting and removing the plug member and shaft from the pipe through the fitting.

11. A plumbing tool for use in plugging a cut pipe for attachment of a fitting to the cut end of the pipe, the tool comprising a shaft, a sleeve surrounding the shaft, a screw threaded portion at one end of the shaft, a nut for engaging the screw threaded portion, a cylindrical resilient plug member for mounting on the end of the shaft remote from the screw threaded portion and arranged such that rotation of the nut and the screw threaded portion causes relative axial movement of the sleeve and the shaft axially compressing the resilient plug member so that the plug expands radially into contact with the inside surface of the pipe to plug the pipe, the radial extent of the shaft, sleeve, nut and plug being less than that of the pipe, and a stop member removably and axially adjustably mountable on the sleeve for locating the position of the plug member and nut relative to the end of the pipe and including a flexible water impermeable bag, means for attaching the bag to a pipe such that it surrounds a portion of the pipe, support means for lifting part of the bag away from the pipe to allow access to the pipe, hand receiving opening means in the bag whereby the operator can insert his hands into the interior of the bag for operating upon the pipe and liquid drain means for draining liquid escaping from the pipe to the bag.

12. A kit of parts for use in plugging cut pipes for attachment of a fitting to the cut end of the pipe comprising two shafts, each having a sleeve therearound, a screw threaded portion at one end of the shaft and a nut engaging the screw threaded portion, and a plurality of cylindrical resilient plug members in a range of diameters from half inch through two and half inches each for mounting in turn on the end of one of the shafts remote from the screw threaded portion and arranged such that rotation of the nut on the screw threaded portion causes relative axial movement between the sleeve and the shaft axially compressing the resilient plug member so that it radially expands into contact with the inside surface of the pipe to plug the pipe, the diametrical extent of the shafts, sleeves and nuts being less than one half inch, the length of one of the shafts being greater than the length of a fitting for a two and a half inch pipe plus four inches whereby the plug member can be located within the pipe at least four inches from the fitting while the nut projects from the end of the fitting remote from the pipe and the length of the other shaft being shorter than the first shaft and a stop member removably and axially adjustably mountable on the sleeve of the shafts for locating the position of the plug member and nut relative to the end of the pipe and including a flexible water impermeable bag, means for attaching the bag to a pipe such that it surrounds a portion of the pipe, support means for lifting part of the bag away from the pipe to allow access to the pipe, hand receiving opening means in the bag whereby the operator can insert his hands into the interior of the bag for operating upon the pipe and liquid drain means for draining liquid escaping from the pipe to the bag.

* * * * *